US009115296B2

(12) United States Patent
Kluttz et al.

(10) Patent No.: US 9,115,296 B2
(45) Date of Patent: *Aug. 25, 2015

(54) BITUMINOUS EMULSIONS

(75) Inventors: Robert Q. Kluttz, Houston, TX (US);
Keith E. Stephens, Houston, TX (US);
Willem C. Vonk, Amsterdam (NL); Jan Korenstra, Amsterdam (NL)

(73) Assignee: Kraton Polymers U.S. LLC, Houston, TX (US)

(*) Notice: Subject to any disclaimer, the term of this patent is extended or adjusted under 35 U.S.C. 154(b) by 239 days.

This patent is subject to a terminal disclaimer.

(21) Appl. No.: 11/937,948

(22) Filed: Nov. 9, 2007

(65) Prior Publication Data

US 2008/0114099 A1 May 15, 2008

Related U.S. Application Data

(60) Provisional application No. 60/858,517, filed on Nov. 13, 2006.

(51) Int. Cl.
| | |
|---|---|
| *C08L 95/00* | (2006.01) |
| *C09D 195/00* | (2006.01) |
| *C09J 195/00* | (2006.01) |
| *C08L 9/08* | (2006.01) |
| *C08F 297/04* | (2006.01) |
| *C08F 212/08* | (2006.01) |
| *C08F 236/10* | (2006.01) |
| *C08F 236/06* | (2006.01) |
| *C08L 25/10* | (2006.01) |
| *C08L 53/00* | (2006.01) |
| *C08L 53/02* | (2006.01) |

(52) U.S. Cl.
CPC ........... *C09D 195/005* (2013.01); *C08L 95/005* (2013.01); *C09J 195/005* (2013.01); *C08F 212/08* (2013.01); *C08F 236/06* (2013.01); *C08F 236/10* (2013.01); *C08F 297/04* (2013.01); *C08F 297/044* (2013.01); *C08F 2500/17* (2013.01); *C08L 9/08* (2013.01); *C08L 25/10* (2013.01); *C08L 53/00* (2013.01); *C08L 53/02* (2013.01); *C08L 2205/02* (2013.01); *C08L 2205/025* (2013.01); *C08L 2555/84* (2013.01)

(58) Field of Classification Search
None
See application file for complete search history.

(56) References Cited

U.S. PATENT DOCUMENTS

| | | | |
|---|---|---|---|
| 3,261,635 A | 1/1966 | Holden et al. | |
| 3,244,664 A | 4/1966 | Zelinski et al. | |
| 3,251,905 A | 5/1966 | Zelinski | |
| 3,281,383 A | 10/1966 | Zelinski et al. | |
| 3,390,207 A | 6/1968 | Moss et al. | |
| 3,594,452 A | 7/1971 | De La Mare et al. | |
| 3,598,887 A | 8/1971 | Darcy et al. | |
| 3,880,954 A | 4/1975 | Kahle et al. | |
| 3,985,830 A | 10/1976 | Fetters et al. | |
| 4,076,915 A | 2/1978 | Trepka | |
| 4,104,332 A | 8/1978 | Zelinski | |
| 4,145,322 A | 3/1979 | Maldonado et al. | |
| 4,185,042 A | 1/1980 | Verkouw | |
| 4,219,627 A | 8/1980 | Halasa et al. | |
| 4,379,891 A | 4/1983 | Haynes | |
| 4,921,892 A | 5/1990 | Moore et al. | |
| 5,075,377 A | 12/1991 | Kawabuchi et al. | |
| 5,212,220 A * | 5/1993 | Gelles | 524/68 |
| 5,246,986 A * | 9/1993 | Pierre et al. | 524/68 |
| 5,272,214 A | 12/1993 | Custro et al. | |
| 5,371,121 A | 12/1994 | Bellomy et al. | |
| 5,681,895 A | 10/1997 | Bening et al. | |
| 5,686,535 A | 11/1997 | Erickson et al. | |
| 5,756,563 A | 5/1998 | Brandolese et al. | |

(Continued)

FOREIGN PATENT DOCUMENTS

| | | |
|---|---|---|
| EP | 0387671 A1 | 9/1990 |
| EP | 0413294 A2 | 2/1991 |
| EP | 0463724 A2 | 1/1992 |
| EP | 0636654 A1 | 2/1995 |
| EP | 0940440 A1 | 9/1999 |
| JP | 4161460 A | 6/1992 |

(Continued)

OTHER PUBLICATIONS

Perez-Lepe A et al: High Temperature Stability of Different Polymer Modified Bitumens: A Rheological Evaluation, Journal of Applied Polymer Science, John Wiley & Sons, Inc., U.S., vol. 103, No. 2, Jan. 15, 2007, pp. 1166-1174.
Supplementary European Search Report, dated Aug. 25, 2011.

*Primary Examiner* — Richard A Huhn
(74) *Attorney, Agent, or Firm* — Clements Bernard PLLC; Michael A. Masse

(57) ABSTRACT

The present invention is directed to bituminous emulsions comprising bitumen, water, one or more emulsifiers systems and a diblock copolymer including one block of a monovinylaromatic hydrocarbon and one block of a conjugated diene, wherein the conjugated diene has a peak molecular weight from 30,000 to 78,000 and a vinyl content from 35 to 80 mol percent based on the number of repeat monomer units in the conjugated diene block. A block copolymer comprising at least two blocks of monovinylaromatic hydrocarbon and at least one block of conjugated diene, the block copolymer selected from linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the ratio of (i) to (ii) in the block copolymer composition is greater than 1:1.

19 Claims, No Drawings

(56) References Cited

U.S. PATENT DOCUMENTS

| | | | | |
|---|---|---|---|---|
| 5,795,929 | A | * | 8/1998 | Grubba ............... 524/60 |
| 5,798,401 | A | * | 8/1998 | Korenstra et al. ............... 524/68 |
| 6,087,420 | A | * | 7/2000 | Planche et al. ............... 524/68 |
| 6,429,241 | B1 | * | 8/2002 | Liang ............... 524/68 |
| 6,855,754 | B2 | | 2/2005 | Takamura et al. |
| 2004/0167292 | A1 | | 8/2004 | Willis |
| 2005/0065287 | A1 | | 3/2005 | Willis et al. |
| 2005/0137295 | A1 | | 6/2005 | Kendrick et al. |
| 2005/0197465 | A1 | | 9/2005 | Handlin, Jr. |

FOREIGN PATENT DOCUMENTS

| | | |
|---|---|---|
| JP | 5240447 B2 | 7/2013 |
| RU | 2237692 C1 | 10/2004 |
| WO | 8912079 A2 | 12/1989 |
| WO | 94/22931 A1 | 10/1994 |
| WO | 9710304 A2 | 3/1997 |
| WO | 03066696 A1 | 8/2003 |
| WO | 03102032 A2 | 12/2003 |
| WO | 2004058840 A1 | 7/2004 |
| WO | 2005030821 A1 | 4/2005 |

* cited by examiner

BITUMINOUS EMULSIONS

CROSS-REFERENCE TO RELATED APPLICATION

The present application claims priority from commonly assigned U.S. provisional patent application Ser. No. 60/858,517, filed Nov. 13, 2006, entitled Bituminous Emulsions.

FIELD OF THE INVENTION

The present invention relates to a bituminous emulsion having improved high storage stability compared to conventional emulsions, said bituminous emulsion comprising a block copolymer composition containing a high vinyl content diblock copolymer and an optional high vinyl content block copolymer selected from linear triblock copolymers, multiarm coupled block copolymers and mixtures thereof in combination with bitumen, water and one or more emulsifier systems, wherein said diblock copolymer is present alone or is present at a ratio of greater than 1:1 when combined with the other noted copolymers.

BACKGROUND OF THE INVENTION

Bitumen is a common material utilized in the preparation of paving, roofing and coating materials. While the material is suitable in many respects, it is inherently deficient in some physical properties. It is highly desirable to improve upon these physical properties. Diene polymer rubbers such as styrene-butadiene rubber and styrene-rubber block copolymers such as styrene-butadiene-styrene and styrene-isoprene-styrene block copolymers have been added to bitumen in the past to dramatically improve the thermal and mechanical properties of bitumens.

Bitumen emulsions and dispersions have also been known for some time. These emulsions and dispersions are characterized as heterogeneous 2-phase systems consisting of two immiscible materials, bitumen and water. The bitumen is dispersed throughout the continuous water phase in the form of discreet globules which are held in suspension by an emulsifier. Such bitumen emulsions and dispersions have a wide variety of uses such as in road construction, horticultural and agricultural applications, slip coats for concrete, protective coats for concrete, pipelines and ironwork and also for sealing cracks and grouting.

Bitumen emulsions and dispersions that contain polymers are also known. Polymer modification of such emulsions and dispersions gives the same advantages to emulsions and dispersions as to bitumen alone. It is common practice to store emulsions for a period of time between the time of manufacture and the time of application. However, such modified emulsions and dispersions have the disadvantage that they are often not sufficiently stable (they may coalesce, irreversibly flocculate or settle or cream), the coalesced bitumen phase has poor properties after water drying and they are difficult to prepare at high polymer loading. Thus one objective for a successful emulsion is that it be stable during the storage time. With regard to storage stability, polymer modified emulsions often exhibit phase instability which manifests itself in terms of bulk phase separation. Upon standing for long periods of time, different phases may form: a lower or bottom phase that exhibits an increased percentage of dispersed (bituminous) phase and an upper or top phase that exhibits an increased percentage of aqueous phase. As used throughout the present specification, the phrase "storage stability" refers to this phase separation phenomenon.

It is also known to make emulsions and dispersions of polymers in water with a surfactant and then to add the resulting polymer emulsions and dispersions to bitumen in order to obtain improved properties. Addition of a polymer emulsion or dispersion to bitumen provides a means of mixing polymer and bitumen which does not require special high shear high temperature mixing equipment. It does not put the polymer and bitumen through an unnecessary heating step. However, when this process is used, it is often difficult to prepare modified bituminous emulsions and dispersions which demonstrate a good balance between storage stability, viscosity and breaking rate after application, thereby resulting in a product that is stable and easy to apply.

Therefore, there is a need for bitumen emulsions and dispersions that have an increased degree of storage stability and are relatively easy to work with and apply. The present invention provides such emulsions and dispersions.

SUMMARY OF THE INVENTION

The present invention provides bituminous emulsions for road/paving applications that have an increased degree of storage stability and a good balance between storage stability and overall properties when compared to other known bituminous emulsions. In addition, the block copolymers utilized in the bituminous emulsions of the present invention do not require the addition of crosslinking agents thereby decreasing environmental and safety concerns associated with the use of such crosslinking agents. More specifically, the emulsions of the present invention comprise:

(a) bitumen;
(b) water;
(c) one or more emulsifier systems; and
(d) a block copolymer composition comprising:
(i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and
(ii) optionally one or more block copolymers comprising at least two blocks of monovinylaromatic hydrocarbon and at least one block of conjugated diene, the block copolymer selected from linear triblock copolymers, multiarm coupled block copolymers, and mixtures thereof, the linear triblock copolymers having a peak molecular weight that is 1.5 to 3.0 times the peak molecular weight of the diblock copolymer and multiarm coupled block copolymers having a peak molecular weight that is 1.5 to 9.0 times the peak molecular weight of the diblock copolymer, and each having a vinyl content from about 35 to about 80 mol percent based on the number of repeat monomer units in the conjugated diene block, wherein when both (i) and (ii) are present, the ratio of (i) to (ii) is greater than 1:1.

DETAILED DESCRIPTION

The present invention provides bituminous emulsions having an increased degree of storage stability compared to other known bituminous emulsions. The bituminous emulsions of the present invention are particularly useful in a variety of road and paving applications including as driveway sealers, roofing repair materials, caulks, mastics, crack fillers and in paving materials such as seal coats, chip seals and slurry seals. With regard to the present invention, preferably the bituminous emulsions will be used as pavement surface treatments for sealing and repairing roads, drive ways, parking lots and other black topped surfaces, as well as in recycle applications. As used throughout the present specification, the phrase "bituminous emulsions" is intended to also include bituminous dispersions.

By using the block copolymers of the present invention, it is possible to prepare bituminous emulsions that demonstrate increased high storage stability compared to emulsions made with prior art polymers such as Kraton® D1192 polymer and Kraton® D1101 polymer.

The bituminous emulsions of the present invention comprise a bitumen component that may be any naturally occurring bitumen or derived from petroleum. In addition, petroleum pitches obtained by a cracking process and coal tar can be used as the bitumen component as well as blends of various bitumen materials. Examples of suitable components include, but are not limited to, distillation or "straight-run bitumens", precipitation bitumens (e.g. propane bitumens), blown bitumens (e.g. catalytically blown bitumen), multigrades, and mixtures thereof. Other suitable bitumen components include, but are not limited to, mixtures of one or more of these bitumens with extenders (fluxes) such as petroleum extracts, e.g. aromatic extracts, distillates or residues, or with oils. Suitable bitumen components (either "straight-run bitumens" or "fluxed bitumens") are those having a penetration of in the range of from about 25 to about 400 units at 25° C.; therefore quite hard bitumens of a penetration of from about 60 to about 70 units may be used, but generally a straight run or distilled bitumen having a penetration from about 110 to about 250 units will be the most convenient to use. Both compatible as well as incompatible bitumens may be used.

The water that is utilized in the emulsions of the present invention is preferably demineralized water since minerals in other types of water can adversely react with the emulsion system.

In addition to bitumen, water and polymers, one or more emulsifier systems are added to the emulsions of the present invention. As used herein, the phrase "emulsifier system(s)" includes a system that contains one or more emulsifiers alone, one or more emulsifiers in combination with a mineral acid or one or more emulsifiers in combination with a base. Depending upon the type of emulsion desired (cationic, anionic or nonionic) the emulsifier(s) will be selected from: (a) for cationic emulsions, salts of fatty amines, amido amines and imidazolines (or from mixtures comprising members of two or more families noted for cationic emulsions or mixtures of two or more emulsifiers within each family noted for cationic emulsions), with amido amines such as Redicote® E9 (commercially available from Akzo Nobel) and Dinoram S (commercially available from Ceca (of France)) being the most preferred and (b) for anionic emulsions, salts of fatty acids, rosin acids, lignin sulphonates, bentonites and clays (or from mixtures comprising members of two or more families noted for anionic emulsions or mixtures of two or more emulsifiers within each family noted for anionic emulsions), with oleic acid being the most preferred. In the case of cationic emulsions, when amido amines are utilized, they must be mixed and reacted with a mineral acid, e.g. hydrochloric acid, nitric acid, phosphoric acid or sulfuric acid, to attain water solubility. Furthermore, in the case of anionic emulsions, typically bases such as sodium hydroxide are used to attain water solubility.

The block copolymer composition to be used in the above noted emulsions of the present invention comprises:

(i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and (ii) optionally one or more block copolymers comprising at least two blocks of monovinyl aromatic hydrocarbon and at least one block of conjugated diene, said block copolymers selected from linear triblock copolymers having a peak molecular weight that is about 1.5 to about 3.0 times the peak molecular weight of the diblock copolymer (i) and a vinyl content from about 35 to about 80 mol percent based on the number of repeat monomer units in the conjugated diene block, multiarm coupled block copolymers having a peak molecular weight that is about 1.5 to about 9.0 times the peak molecular weight of the diblock copolymer (i) and a vinyl content from about 35 to about 80 mol percent based on the number of repeat monomer units in the conjugated diene block, and mixtures thereof.

Preferably, the block copolymer composition utilized in the emulsions of the present invention comprises a diblock copolymer and either a linear triblock copolymer or a multiarm coupled block copolymer. While hydrogenation of block copolymers is well known in the art, the block copolymers of the present invention are in substantially unhydrogenated form.

In one preferred embodiment of the present invention, the diblock copolymer is of the formula A-B, the linear triblock copolymer is of the formula A-B-A and the multiarm coupled block copolymer is of the formula (A-B)nX, where in said formulas A is a monovinyl aromatic hydrocarbon block, B is a conjugated diene block, n is an integer from 2 to 6 and X is the residue of a coupling agent. When the multiarm coupled block copolymers of the formula (A-B)nX are utilized, n will preferably be an integer from 2 to 4, with 2 being the most preferred.

While the monovinyl aromatic hydrocarbon block may be any monovinyl aromatic hydrocarbon known for use in the preparation of block copolymers such as styrene, o-methylstyrene, p-methylstyrene, p-tert-butylstyrene, 2,4-dimethylstyrene, alpha-methylstyrene, vinylnaphthalene, vinyltoluene and vinylxylene or mixtures thereof, the most preferred monovinyl aromatic hydrocarbon for use in the process of the present invention is styrene, which is used as a substantially pure monomer or as a major component in mixtures with minor proportions of other structurally related vinyl aromatic monomer(s) such as o-methylstyrene, p-methylstyrene, p-tert-butylstyrene, 2,4-dimethylstyrene, α-methylstyrene, vinylnaphtalene, vinyltoluene and vinylxylene, i.e., in proportions of at most 10% by weight. The use of substantially pure styrene is most preferred in the present process.

Similarly, the conjugated diene block may be any conjugated diene known for use in the preparation of block copolymers provided that the conjugated diene has from four to eight carbon atoms. Preferably, the conjugated diene used for the preparation of the conjugated diene blocks is a butadiene monomer or an isoprene monomer that is substantially pure monomer or contains minor proportions, up to 10% by weight, of structurally related conjugated dienes, such as 2,3-dimethyl-1,3-butadiene, 1,3-pentadiene and 1,3-hexadiene. Preferably, substantially pure butadiene or substantially pure isoprene is utilized for the preparation of the conjugated diene blocks, with substantially pure butadiene being the most preferred. Note that the conjugated diene block may also comprise a mixture of butadiene and isoprene monomers.

As used herein with regard to the block copolymers of the present invention, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The peak molecular weight of each monovinyl aromatic hydrocarbon block is from about 10,000 to about 25,000, preferably from about 12,000 to about 20,000. In an alternative embodiment, the peak molecular weight is from about 14,000 to about 18,000.

Each diblock copolymer utilized in the process of the present invention will have a peak molecular weight from about 30,000 to about 78,000, preferably from about 48,000 to about 78,000. The peak molecular weight of the linear triblock copolymers and multiarm coupled block copolymers (ii) is dependent upon the peak molecular weight of the diblock copolymers (i) utilized. More specifically, the peak molecular weight of the triblock copolymers (ii) will range from about 1.5 to about 3.0 times the peak molecular weight of the diblock copolymer (i). Preferably, in those embodiments where the block copolymer (ii) is a linear triblock copolymer, the peak molecular weight of the linear triblock copolymers will range from about 1.8 to about 2.5 times the peak molecular weight of the diblock copolymer (i). The peak molecular weight of the multiarm coupled block copolymers (ii) will range from about 1.5 to about 9.0 times the peak molecular weight of the diblock copolymer (i). In those embodiments where the block copolymer (ii) is a multiarm coupled block copolymer, the peak molecular weight will preferably range from about 1.8 to about 5.0 times the peak molecular weight of the diblock copolymer (i).

It will be appreciated that the term "vinyl content" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 35 to about 80 mol percent of the condensed butadiene units in the polymer block have a 1,2-addition configuration. Preferably, from about 46 to about 70 mol percent of the condensed butadiene units should have 1,2-addition configuration, even more preferably from about 50 to about 65 mol percent of the butadiene units should have 1,2-addition configuration and still even more preferably from about 52 to about 65 mol percent of the butadiene units should have 1,2-addition configuration. When referring to the use of isoprene as the conjugated diene, it is also preferred that about 35 to 80 mol percent of the condensed isoprene units in the block have 3,4-addition configuration. Preferably, from about 46 to about 70 mol percent of the condensed isoprene units in the block have 3,4-addition configuration, even more preferably from about 50 to about 65 mol percent of the isoprene units should have 3,4-addition configuration, and still even more preferably from about 52 to about 65 mol percent of the butadiene units should have 1,2-addition configuration.

The monovinyl aromatic hydrocarbon content of the copolymers (in the present case with regard to each individual diblock copolymer, linear triblock copolymer or multiarm coupled block copolymer) is suitably from about 10 to about 55% by weight, based on the total block copolymer. Preferably, the content of monovinyl aromatic hydrocarbon of the copolymers will be from about 15 to about 45% by weight, more preferably from about 23 to about 37% by weight, even more preferably from about 25 to about 35% by weight, based on the total weight of the copolymer.

As noted above, the block copolymer composition utilized in the emulsions of the present invention may comprise 100% diblock or it may comprise a mixture of diblock copolymer and either a linear triblock copolymer, a multiarm coupled block copolymer, or mixtures thereof. Preferably, the combination of diblock copolymer and multiarm coupled block copolymer with two arms is used. When the block copolymer composition comprises a mixture of diblock copolymer and either a linear triblock copolymer, a multiarm coupled block copolymer, or a mixture thereof, the ratio of the diblock copolymer to linear triblock copolymer, multiarm coupled block copolymer or mixture thereof will be greater than about 1:1, preferably equal to or greater than about 3:2. In a particularly preferred embodiment, the ratio of the diblock copolymer to linear triblock copolymer, multiarm coupled block copolymer, or mixture thereof will be from about 3:2 to about 10:1 with the most preferred ratio being from about 4:1 to about 7:3. In other words, in the broadest sense of the present invention, when the block copolymer composition comprises a diblock copolymer and either a linear triblock copolymer, a multiarm coupled block copolymer, or a mixture thereof, the linear triblock copolymer, multiarm coupled block copolymer, or mixture thereof will always be present in an amount less than that of the diblock copolymer (e.g., the linear triblock copolymer, multiarm coupled block copolymer, or mixture thereof will be present in the block copolymer composition in an amount of at most 49.9% by weight, preferably at most 40% by weight).

The bituminous emulsions of the present invention can be manufactured using any of the methods known in the art for manufacturing bituminous emulsions such as by using colloidal mills or high shear mixers in a continuous process. The emulsions of the present invention can be prepared by mixing a bitumen component with an emulsifier solution containing one or more emulsifier systems. The bitumen component is prepared by blending bitumen with the block copolymer composition of the present invention. The success of the final emulsion is not dependent upon the type of tank (or vessel) utilized to prepare the bitumen component of the present invention. Accordingly, any known tank or vessel utilized in the preparation of bitumen compositions can be used provided that such tank or vessel has stirring (agitation) and heating capabilities. As used within the scope of the present invention, the phrase "stirred tank" refers to such tanks and vessels that have stirring (agitation) and heating means. Suitable stirring or agitation includes, but is not limited to, vertical impellers, side-arm impellers and pump around circulation. In terms of carrying out the process, the bitumen component is typically placed in the stirred tank and gradually heated to the desired temperature. In the case of the present invention, the bitumen will typically be heated to a temperature from about 145° C. to about 195° C., preferably from about 165° C. to about 185° C. The bitumen component is typically stirred or agitated during this heating phase. While the presence of air is not detrimental to the process of the present invention (i.e., the use of an open air vessel which results in the surface of the mixture coming in contact with air), the intentional introduction of air (as in the case of air curing or blown bitumen) is not necessary to the process of the present invention and is in fact discouraged since such addition would most likely result in the hardening of the bitumen component.

Once the bitumen component has reached the desired temperature, the block copolymer composition (described hereinbelow) is added while the bitumen component is being stirred in order to form a homogeneous mixture of the bitumen component and the block copolymer composition.

The manner and form in which the block copolymer composition is added to the bitumen component is also not critical to the invention. Therefore, block copolymer compositions in the form of powders, porous pellets, and/or crumb may be added all at once or divided into small amounts or batches and added at intervals over a brief period of time. In most instances, the block copolymer composition is added in the form of a porous pellet all at once. During the addition of the block copolymer composition, the mixture is stirred and the temperature to which the bitumen component was heated is maintained.

The emulsifier solution can be prepared by simply adding one or more emulsifying system components (emulsifiers and mineral acid in the case of cationic emulsions and emulsifiers and bases in the case of anionic emulsions) to water and heating the mixture to allow dissolving. Once the bitumen component and emulsifier solution are prepared, they are mixed together, e.g. by being fed in separately but simultaneously into a colloid mill. The temperature of the bitumen component and emulsifier solution will vary depending upon the grade and percentage of bitumen in the emulsion, the type of emulsifier, etc. Generally, the bitumen component temperatures upon addition will be from about 120° C. to about 160° C., preferably from about 135° C. to about 150° C., even more preferably about 145° C. although when high levels of polymer are used, it may be desirable to use slightly higher temperatures. The temperature of the emulsifier solution upon addition to the mixture will typically be from about 30° C. to about 60° C., preferably about 45° C. to about 50° C. The two phases (bitumen component and emulsifier solution) are mixed together, e.g. in the colloid mill they are subjected to intense shearing forces which cause the bitumen to break into small globules. The individual globules are then coated with the emulsifier which gives the surface of the droplets an electrical charge (in the case of anionic or cationic emulsifiers) and the resulting electrostatic forces prevent the globules from coalescing.

Generally, the bitumen emulsions of the present invention contain from about 60% to about 75% by weight, preferably 65% to 70% by weight, of dispersed phase, i.e. the bitumen plus polymer (plus any other additives), and 40 to 25% by weight, preferably 35% to 30% by weight, of water or aqueous phase, i.e. the water plus emulsifier system(s) and any other additives (said amounts based on the total of 100% of dispersed phase plus aqueous phase.

The dispersed phase of the emulsion generally will contain from about 99% to about 94% by weight, preferably from about 98.5% to about 95% by weight, and even more preferably from about 97% to about 96% by weight, bitumen and from about 1.0% to about 6% by weight, preferably from about 1.5% to about 5% by weight, even more preferably from about 2.0% to about 4% by weight, of the polymer based on a total of 100% of bitumen plus polymer. If other components are added to the dispersed phase composition prior to emulsification, for example other block copolymers, then the above concentration limits based only on bitumen plus block copolymer still hold.

The water or aqueous phase of the emulsion will contain an from about 0.3% to 0.8% by weight, preferably from about 0.4% to about 0.6% by weight, of one or more emulsifier systems as defined hereinbefore, and optionally from about 0.35% to about 0.6% by weight, preferably from about 0.45% to about 0.55% by weight, of a mineral acid or base, and the rest water (said amounts based on the total of 100% of emulsifier system(s), mineral acid or base and water). If other components are added to the water phase, as for example when a mineral acid is added in the case where the emulsifier is an amine, then the above concentration limit based only on emulsifier plus water still holds.

The emulsions prepared with the polymer composition of the present invention may generally be used for all of the standard uses for bituminous emulsions. A variety of such uses are described in The Shell Bitumen Handbook edited by D. Whiteoak and published by Shell Bitumen U.K. in the United Kingdom in 1990, which is herein incorporated by reference. Other uses for these emulsions and dispersions include roof coatings, interply adhesives for roofing felts and roll products, paving chip seal binders, paving slurry seal binders, additives in recycled asphalt pavements, binders for cold prepared asphaltic concrete, fiberglass mat binders and the like.

The polymer and bitumen emulsions of the present invention can optionally be formulated with solvents, oils, fluxes, antioxidants, and other polymers and block polymers prior to forming the water based emulsions or dispersions. They also can be formulated with water soluble thickeners, pigments, pigment dispersing aids, other water based emulsions and dispersions, and the like. The antioxidants can be water soluble.

In an alternative embodiment of the present invention, the block copolymer composition is added to the bitumen to form the bitumen component of the present invention which is then heat treated prior to being mixed with the emulsifier solution mixture (water phase). This heat treatment is conducted in order to increase the effectiveness of polymer modification and to improve the compatibility between bitumen and polymer resulting in higher dynamic viscosity. More specifically, the bitumen component is heat treated at a temperature ranging from about 175° C. to about 220° C., in another embodiment from about 178° C. to about 210° C., and in still another alternative, from about 180° C. to about 200° C., or any combination of these ranges, for a period of time from about 4 to about 30 hours, alternatively from about 6 to about 24 hours, preferably from about 10 to about 16 hours, and still further from about 12 to about 14 hours, or any combination of these ranges.

For typical applications, emulsions are applied on a surface in a film. Good thickness control and surface coverage are necessary so the right degree of viscosity is desirable (if the emulsion is too viscous, it will be difficult to apply and if the emulsion is of sufficiently low viscosity, the emulsion will run off the road before it sets). Also, it is common to store emulsions for a period of time between the time of manufacture and the time of application. Accordingly, it is highly desirable to produce an emulsion that is stable during the storage time. With polymer modified bitumen, it is generally very difficult to achieve the right balance between viscosity and storage stability.

The block copolymer compositions utilized in the process of the present invention may be prepared by any method known in the art including the well known full sequential polymerization method, optionally in combination with reinitiation, and the coupling method, as illustrated in e.g. U.S. Pat. No. 3,231,635; U.S. Pat. No. 3,251,905; U.S. Pat. No.

3,390,207; U.S. Pat. No. 3,598,887, U.S. Pat. No. 4,219,627, EP 0413294 A2, EP 0387671 B1, EP 0636654 A1 and WO 94/22931, each incorporated herein by reference in their entirety.

The block copolymers may therefore, for example, be prepared by coupling at least two diblock copolymer molecules together. The coupling agent may be any di- or polyfunctional coupling agent known in the art, for example, dibromoethane, diethyl adipate, divinylbenzene, dimethyldichlorosilane, methyl dichlorosilane, silicon tetrachloride and alkoxy silanes (U.S. Pat. No. 3,244,664, U.S. Pat. No. 3,692,874, U.S. Pat. No. 4,076,915, U.S. Pat. No. 5,075,377, U.S. Pat. No. 5,272,214 and U.S. Pat. No. 5,681,895), polyepoxides, polyisocyanates, polyimines, polyaldehydes, polyketones, polyanhydrides, polyesters, polyhalides (U.S. Pat. No. 3,281,383); diesters (U.S. Pat. No. 3,594,452); methoxy silanes (U.S. Pat. No. 3,880,954); divinyl benzene (U.S. Pat. No. 3,985,830); 1,3,5-benzenetricarboxylic acid trichloride (U.S. Pat. No. 4,104,332); glycidoxytrimethoxy silanes (U.S. Pat. No. 4,185,042); and oxydipropylbis(trimethoxy silane) (U.S. Pat. No. 4,379,891).

In general, the polymers useful in the process of the present invention may be prepared by contacting the monomer or monomers with an organoalkali metal compound in a suitable solvent at a temperature within from about −150° C. to about 300° C., preferably at a temperature within the range of from about 0° C. to about 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec butyl is preferred. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Accordingly, suitable solvents include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

As used throughout the present specification, the term "diblock copolymer", references that proportion of free diblock which is finally present in the applied block copolymer composition. It will be appreciated that when the block copolymer composition is prepared via a full sequential polymerization, no material detectable amounts of free diblock copolymers will occur. In this situation, the finally desired amount of diblock can be adjusted to achieve the amount of diblock necessary for the present invention. Accordingly, in the process of the present invention, when the block copolymer composition comprises a diblock copolymer in combination with a linear triblock copolymer made by full sequential polymerization, the amount of monovinyl aromatic hydrocarbon added in the final step of preparing the block copolymer can be adjusted to limit the total amount of triblock copolymer or in the alternative, a sufficient amount of the diblock copolymer can be added to the fully polymerized linear triblock copolymer to achieve the necessary ratio.

When the block copolymers are prepared via initial preparation of intermediate living diblock copolymers, which are subsequently coupled by means of a multivalent coupling agent, the initial diblock content will be determined by the coupling efficiency. Normally in the preparation of most block copolymers, a coupling efficiency in the range of from 80% to 97% is desirable. However, in the present process, while it is possible to utilize polymers having a coupling efficiency of up to 50%. Preferably, there is an even lower degree of coupling (equal to or less than 40% coupling efficiency). For purposes of the present invention, the phrase "coupling efficiency" refers to the number of molecules of coupled polymer divided by the number of molecules of coupled polymer plus the number of molecules of uncoupled polymer. For example, if a coupling efficiency is 80 percent, then the polymer will contain 20 percent diblock. This is well known to those of ordinary skill in the art.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

In addition other optional ingredients may be a part of the block copolymer composition utilized in the present invention, including, but not limited to, resins, oils, stabilizers, anti-statics, fillers (such as talc, calcium carbonate and carbon black), polyphosphoric acid, ground tire rubber or flame retardants. The amount of such optional ingredients added can range from 0 to about 20% by weight, based on the total weight of the bituminous binder composition. Particularly preferred additional ingredients are antioxidants which may be added during or after the mixing process to affect the rate of reaction. When antioxidants are added, they are present in an amount from about 0.1% by weight to about 5% by weight, based on the total weight of the bituminous binder composition. In addition, other block copolymers may also be included in the block copolymer composition utilized in the present invention. Preferably such block copolymers will be block copolymers of the general formulas C-D-C or (C-D)nX wherein C is a monovinyl aromatic hydrocarbon block and D is a conjugated diene block, n is an integer from 2 to 6 and X is the residue of a coupling agent, said block copolymer having a peak molecular weight from about 30,000 to about 400,000 and a vinyl content from about 8 mol percent to about 25 mol percent based on the number of repeat monomer units in the conjugated diene block of the block copolymer. Examples of such block copolymers include, but are not limited to, Kraton D 1101 polymer and Kraton D 1184 polymer, each commercially available from Kraton Polymers LLC. When such additional block copolymers are present, they will preferably be present in an amount up to about 30% by weight, based on the total weight of block copolymer added. When these additional components are added to the process, they are typically added at the same time as the block copolymer composition. Alternatively, these additional components may be added just before the addition of the block copolymer composition or just after the addition of the block copolymer composition.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustrative purposes only and are not to be construed as limiting the invention.

EXAMPLES

Bituminous Emulsions
Polymers Utilized for the Preparation of Emulsions

| Polymer Name | Kraton D1192 polymer | Poly. 1 (the present invention) |
|---|---|---|
| Styrene block molecular weight* | 14,000 | 16,000 |
| Diblock molecular weight* | NA | 80,000 |
| Triblock/radial molecular weight* | 150,000 | 161,000 |
| Styrene content | 30.5% | 30% |
| Coupling efficiency | NA | 20% |
| Vinyl content | 40% | 60% |

*The molecular weights referenced are peak molecular weights.
Kraton D1192 polymer is a sequential styrene-butadiene-styrene block copolymer having a relatively high vinyl content and in porous pellet form, commercially available from Kraton Polymers LLC.

Preparation of the Bitumen Component (a Preblend of Bitumen Modified with Thermoplastic Polymer)

Venezuelan bitumen of penetration 180 units was preheated to 160° C. in an oven. The preheated bitumen was then transferred to a mixing device equipped with a high shear mixer/disintegrator (revolution speed 6000 rpm at maximum) and stirred for between 15 and 30 minutes at half-revolution speed to equilibrate at 160° C. in the mixing device. The pre-weighed amount of cold SBS polymer (3% by weight noted calculated based on the total blend) was then dosed into the hot bitumen within 2 minutes. During the dosage of the polymer the revolution speed of the high shear mixer was gradually increased to the maximum of 6000 rpm, thus introducing enough mechanical energy to raise the temperature of the mixture bitumen/SBS polymer to 180° C. without additional heating. The mixture was maintained at constant temperature by switching the high shear mixer off and on. Total mixing time for each sample was at least 30 minutes but no longer than 60 minutes. The pre-blend was cooled down to ambient temperature and set aside. In addition to the above, additional examples were formulated that involved the block copolymer composition of the present invention at 3% by weight that was heat treated for 12 hours at 190° C. to enable thermal coupling/crosslinking.

A variety of Bitumen Polymer Mixtures (BPM) were made in the manner noted above and were then tested for UV-homogeneity, Softening Point, R&B according to ASTM D-36, Penetration according to ASTM D-5, Penetration Index calculated from the Softening Point and Penetration, and Dynamic Viscosity with a procedure similar to ASTM D-4402. Results are noted in Table 1 below.

Bitumen Polymer Mixture 1 (BPM 1)
Poly. 1 was mixed with Venezuelan bitumen in an amount to give a 3% by weight concentration of polymer based on 100% bitumen plus polymer to give a bitumen phase.
Bitumen Polymer Mixture 2 (BPM 2)
Duplicate of BPM 1.
Bitumen Polymer Mixture 3 (BPM 3)
This mixture was prepared in the same manner as BPM 1 with the exception that Poly. 1 was used in an amount of 4% by weight based on 100% by weight of the polymer and bitumen.
Bitumen Polymer Mixture 4 (BPM 4)
This example was prepared in the same manner as BPM 1 with the exception that Poly. 1 was used in an amount of 5% by weight based on 100% by weight of the polymer and bitumen.
Bitumen Polymer Mixture 5 (BPM 5)
This example was prepared in the same manner as BPM 1 with the exception that Poly. 1 which was used in an amount of 3% by weight based on 100% by weight of the polymer and bitumen was heat treated at 180° C. for 12 hours prior to being emulsified.
Comparative Bitumen Mixture 1 (CBM1)
This mixture consisted of bitumen only.
Comparative Bitumen Polymer Mixture 1 (CBPM 1)
This example was prepared in the same manner as BPM 1 with the exception that Kraton D-1192 polymer was used in an amount of 3% by weight based on 100% by weight of the polymer and bitumen.
Preparation of Cationic Emulsifier Solution De-mineralized water was heated in a glass flask on a hotplate magnetic stirrer to 45° C. While stirring gently, approximately 0.5% by weight of a polyamide type emulsifying agent (Redicote E9, commercially available from Akzo Nobel) was added to the stirred warm water, immediately followed by the addition of approximately 0.4% by weight of a concentrated mineral acid (HCl-hydrochloric acid, 37%). Stirring was continued until the aqueous phase in the flask was bright and transparent indicating that the emulsifier has completely dissolved and formed a cationic system for emulsification of the pre-blended bitumen component. The acidity of the aqueous phase was found to be pH 2.1+/−0.1
Atmospheric Emulsification of Pre-Blend of Bitumen and Polymer with Aqueous Emulsifier Solution using a Colloid Mill The emulsification process was carried out atmospherically using a "Fryma" colloid mill. The bituminous polymer

TABLE 1

Bitumen blended with high vinyl SBS polymer (Kraton D1192 polymer) and high vinyl SB polymer (Poly. 1, the inventive polymer of the present invention)

| Experiment no. | Bitumen Only CBM 1 | +3% m D-1192 CBPM 1 | +3% m Poly. 1 BPM 1 | +3% m Poly. 1 (Dupl.) BPM 2 | +4% m Poly. 1 BPM 3 | +5% m Poly. 1 BPM 4 | +3% m Poly. 1 + 12 hr 180° C. BPM 5 |
|---|---|---|---|---|---|---|---|
| UV-homogeneity, +/− | | + | + | + | + | − | + |
| Soft.Point R&B, ° C. | 39.0 | 46.0 | 48.0 | 48.0 | 48.5 | 55.0 | 59.5 |
| Penetration 25° C., dmm | 177 | 104 | 98 | 98 | 115 | 95 | 64 |
| Penetration index, | −1.0 | | | | | | |
| Dyn. viscosity, shear rate 100 s −1 | | | | | | | |
| 120° C., mPas | 439 | 1188 | 1090 | 1090 | 1271 | 1735 | 2331 |
| 150° C., mPas | 110 | 287 | 259 | 259 | 291 | 353 | 491 |
| 180° C., mPas | | 99 | 88 | 88 | 101 | 116 | 155 | pre-blend was heated to 145° C. and filled in a feeder tank. As noted above, the aqueous phase was heated to 45° C. and filled into a separate feeder tank. The bituminous phase and the aqueous phase were both pumped to the colloid mill in a weight ratio of approximately 70:30. The colloid mill was operated at 90° C. After passing through the colloid mill, the emulsion prepared left at a temperature of about 90° C. The freshly prepared emulsion was set aside in an oven at 80° C. to get rid of any entrapped air for 16 hours. After cooling of the emulsion to ambient temperatures, the emulsion was poured over a 640 micron (μm) copper sieve to separate coarse material (particles) thereby determining the weight of sieve residue relative to the amount of emulsion passed through the sieve. Once passed over the 640 micron sieve, the emulsion was ready for further analysis.

Using the above noted mixtures, a variety of cationic emulsions were prepared as follows and then tested for Sieve Residue, Acidity $H_2O$ phase, Acidity emulsion, Dynamic Viscosity and Storage Stability. The ratio of bitumen/polymer mixture to water is noted with each example. For each example, the water phase consisted of water and 0.5% Redicote E9 emulsifier. The ratio of bitumen phase to water phase for each sample is noted in Table 2 below along with the results obtained.

Example 1

This example consisted of a mixture of BPM 1 with water phase at a ratio of 69.5:30.5.

Example 2

This example is a duplicate of Example 1 and consisted of a mixture of BPM 2 with water phase at a ratio of 70.0:30.

Example 3

This example consisted of a mixture of BPM 3 with water phase at a ratio of 69.2:30.8.

Example 4

This example consisted of a mixture of BPM 4 with water phase at a ratio of 70.0:30.0.

Example 5

This example consisted of a mixture of BPM 5 with water phase at a ratio of 69.0:31.0.

Comparative Example 1

This example consisted of CBM 1 with water phase at a ratio of 70.0:30.0.

Comparative Example 2

This example consisted of CBPM 1 with water phase at a ratio of 70.5:29.5.

Comparative Example 3

This example was a duplicate of Comparative Example 1 and consisted of CBM 1 with water phase at a ratio of 70.0:30.0.

Analysis and Testing of the SBS-Polymer Modified Bitumen Emulsion

Within a total of 8 days the emulsion was analyzed with regard to:
- Bitumen/water content of the emulsion by azeotropic distillation with toluene
- acidity of the emulsion (typical values 2.0-3.5 pH)
- dynamic viscosity at 25° C.
- storage stability for seven days at ambient conditions

TABLE 2

Cationic emulsions of Bitumen with high vinyl SBS (Kraton D-1192 polymer) and high vinyl SB (Poly. 1, the inventive polymer of the present invention)

| Experiment no. | CBM 1 Comp. 1 | CBPM 1 Comp. 2 | BPM 1 Ex. 1 | Bitumen Comp. 3 | BPM 2 Ex. 2 | BPM 3 Ex. 3 | BPM 4 Ex. 4 | BPM 5 Ex. 5 |
|---|---|---|---|---|---|---|---|---|
| Sieve residue 640 μ, % m | 0.01 | 0.27 | 0.08 | 0.02 | 0.07 | 0.12 | 0.11 | n.d. |
| Acidity H2O phase, pH | 2.07 | 2.07 | 2.07 | 2.13 | 2.13 | 2.13 | 2.13 | 2.02 |
| Acidity emulsion, pH | 2.38 | 2.32 | 2.44 | 2.55 | 2.56 | 2.57 | 2.36 | 2.82 |
| Bitumen content, % m | 70.0 | 70.5 | 69.5 | 70.0 | 70.0 | 69.2 | 70.0 | 69.0 |
| Water content, % m | 30.0 | 29.5 | 30.5 | 30.0 | 30.0 | 30.8 | 30.0 | 31.0 |
| Dyn.viscosity, shear rate 120 s −1 | | | | | | | | |
| 25° C., mPas | 545 | 134 | 601 | 538 | 536 | 681 | 745 | 920 |
| Storage stability | | | | | | | | |
| 7 days 20-25° C. | | | | | | | broken | broken |
| Δ % H2O top-bot, % m | 6.2 | 0.6 | 0.4 | 5.8 | 1.7 | 0.6 | n.d. | n.d. |

As can be seen from the data above, high viscosity and poor storage stability are observed with unmodified bitumen. However, when bitumen is modified with a known block copolymer (3% Kraton D-1192), low viscosity and good storage stability are observed. When the polymer of the present invention (Poly. 1) was used to modify the bitumen, high viscosity and good storage stability was obtained. This was especially true when the lower levels of Poly. 1 were used since higher concentrations resulted in mechanical breaking (coagulation) of the emulsion under agitation.

When Poly. 1 was heat treated for 12 hours at 190° C. before emulsification and was then used in the emulsification at a level of 3%, a much higher dynamic viscosity was observed. This viscosity was even higher than that observed with emulsions having 5% Poly. 1 (non-heat treated) in the emulsion. More specifically, when 3% Poly. 1 was utilized, a viscosity of 601 (536 for the duplicate) was achieved versus a viscosity of 745 when a 5% concentration was utilized versus a viscosity of 920 when 3% heat treated Poly. 1 was utilized thereby indicating that with Poly. 1 heat treating of the polymer/bitumen blend prior to emulsification leads to higher dynamic viscosity.

What is claimed is:

1. A bituminous emulsion comprising: (a) bitumen; (b) water; (c) one or more emulsifier systems; and (d) a block copolymer composition comprising
   (i) a diblock copolymer comprising one block of a monovinylaromatic hydrocarbon and one block of a conjugated diene, wherein the conjugated diene block has a peak molecular weight from 30,000 to 78,000 and a vinyl content from 35 to 80 mol percent based on the number of repeat monomer units in the conjugated diene block, and
   (ii) a block copolymer comprising at least two blocks of monovinylaromatic hydrocarbon and at least one block of conjugated diene, the block copolymer selected from linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the ratio of (i) to (ii) in the block copolymer composition is greater than 1:1,
   wherein said bitumen plus block copolymer composition comprises from 60 to 75 wt. % of 100 wt. % of the bituminous emulsion, and the water plus one or more emulsifier systems comprises from 40 to 25 wt. % by wt. based on 100 wt. % bituminous emulsion, the block copolymer composition being in the range of 2 to 4 wt. % based on 100 wt. % of the bitumen plus block copolymer composition, and
   wherein said bituminous emulsion has a dynamic viscosity of 536 to 681 mPas., the dynamic viscosity being measured at 25° C., at a shear rate of 120 seconds$^{-1}$, and wherein said bituminous emulsion has storage stability after 7 days at 20-25 C, and wherein said bituminous emulsion is free of crosslinking agents.

2. The bituminous emulsion of claim 1 wherein the ratio of (i) to (ii) in the block copolymer composition is greater than or equal to 3:2.

3. The bituminous emulsion of claim 2 wherein the diblock copolymer (i) is of the formula A-B and the block copolymer (ii) is selected from block copolymers of the formula A-B-A and $(A-B)_nX$ wherein with regard to the formulas A is a block of monovinyl aromatic hydrocarbon, B is a block of conjugated diene, n is an integer from 2 to 6 and X is a coupling agent residue.

4. The bituminous emulsion of claim 3 wherein the one or more emulsifier systems are selected from systems comprising one or more emulsifiers and systems comprising one or more emulsifiers in combination with a mineral acid or a base.

5. The bituminous emulsion of claim 4 wherein the one or more emulsifier systems comprise one or more emulsifiers selected from one or more salts of fatty acids, one or more amido amines and one or more imidazoles or mixtures thereof.

6. The bituminous emulsion of claim 5 wherein the one or more emulsifiers are amido amines.

7. The bituminous emulsion of claim 4 wherein the one or more emulsifier systems comprise one or more emulsifiers in combination with a mineral acid wherein the emulsifiers are selected from one or more salts of fatty acids, one or more amido amines and one or more imidazoles or mixtures thereof and the mineral acid is selected from hydrochloric acid, nitric acid, phosphoric acid and sulfuric acid.

8. The bituminous emulsion of claim 7 wherein the one or more emulsifiers are amido amines and the mineral acid is hydrochloric acid.

9. The bituminous emulsion of claim 1 wherein in the water plus the one or more emulsifier systems, the one or more emulsifier systems comprise from 0.3 to 0.6% by weight based upon 100% of the water plus one or more emulsifier systems.

10. The bituminous emulsion of claim 4 wherein the one or more emulsifier systems comprise one or more emulsifiers selected from fatty acids, rosin acids, lignin sulphonates, bentonites and clays or mixtures thereof.

11. The bituminous emulsion of claim 6 wherein the block copolymer composition comprises A-B and A-B-A wherein each A is styrene and each B is butadiene, the peak molecular weight of A-B is from 48,000 to 78,000, the vinyl content is from 46 to 70 mol percent based on the number of repeat monomer units in the conjugated diene block of A-B and the polystyrene content is from 25 to 35%, and the peak molecular weight of A-B-A is 1.8 to 2.5 times the peak molecular weight of A-B, the vinyl content is from 46 to 70 mol percent based on the number of repeat monomer units in the conjugated diene block of A-B-A and the polystyrene content is from 25 to 35%.

12. The bituminous emulsion of claim 8 wherein the block copolymer composition comprises A-B and A-B-A wherein each A is styrene and each B is butadiene, the peak molecular weight of A-B is from 48,000 to 78,000, the vinyl content of A-B is from 46 to 70 mol percent based on the number of repeat monomer units in the conjugated diene block of A-B and the polystyrene content is from 25 to 35% by weight, and the peak molecular weight of A-B-A is 1.8 to 2.5 times the peak molecular weight of A-B, the vinyl content of A-B-A is from 46 to 70 mol percent based on the number of repeat monomer units in the conjugated diene block of A-B-A and the polystyrene content is from 25 to 35% by wt.

13. The bituminous emulsion of claim 10 wherein the block copolymer composition comprises A-B and A-B-A wherein each A is styrene and each B is butadiene, the peak molecular weight of A-B is from 48,000 to 78,000, the vinyl content is from 46 to 70 mol percent based on the number of repeat monomer units in the conjugated diene block of A-B and the polystyrene content is from 25 to 35%, and the peak molecular weight of A-B-A is 1.8 to 2.5 times the peak molecular weight of A-B, the vinyl content is from 46 to 70 mol percent based on the number of repeat monomer units in the conjugated diene block of A-B-A and the polystyrene content is from 25 to 35%.

14. The bituminous emulsion of claim 6 wherein the block copolymer composition comprises A-B and $(A-B)_nX$ wherein each A is styrene, each B is butadiene, and n is 2 to 4, the peak molecular weight of A-B is from 48,000 to 78,000, the vinyl content from 46 to 70 mol percent based on the number of repeat monomer units in the conjugated diene block of A-B, and the polystyrene content is from 25 to 35%, and the peak molecular weight of $(A-B)_nX$ is 1.8 to 5.0 times the peak molecular weight of A-B, the vinyl content is from 46 to 70 mol percent based on the number of repeat monomer units in the conjugated diene block of $(A-B)_nX$ and the polystyrene content is from 25 to 35%.

15. The bituminous emulsion of claim 8 wherein the block copolymer composition comprises A-B and $(A-B)_nX$ wherein each A is styrene, each B is butadiene, and n is 2 to 4 the peak molecular weight of A-B is from 48,000 to 78,000, the vinyl content of A-B is from 46 to 70 mol percent based on the number of repeat monomer units in the conjugated diene block of A-B, and the polystyrene content is from 25 to 35% by weight, and the peak molecular weight of $(A-B)_nX$ is 1.8 to 5.0 times the peak molecular weight of A-B, the vinyl content of A-B-A is from 46 to 70 mol percent based on the number of repeat monomer units in the conjugated diene block of $(A-B)_n$ X and the polystyrene content is from 25 to 35% by wt.

16. The bituminous emulsion of claim 10 wherein the block copolymer composition comprises A-B and $(A-B)_nX$ wherein each A is styrene, each B is butadiene, and n is 2 to 4, the peak molecular weight of A-B is from 48,000 to 78,000, the vinyl content from 46 to 70 mol percent based on the number of repeat monomer units in the conjugated diene block of A-B, and the polystyrene content is from 25 to 35%, and the peak molecular weight of $(A-B)_nX$ is 1.8 to 5.0 times the peak molecular weight of A-B, the vinyl content is from 46 to 70 mol percent based on the number of repeat monomer units in the conjugated diene block of $(A-B)_nX$ and the polystyrene content is from 25 to 35%.

17. The bituminous emulsion of claim 6 wherein the block copolymer composition comprises A-B wherein each A is styrene, each B is butadiene, and n is 2 to 4, the peak molecular weight of A-B is from 48,000 to 78,000, the vinyl content is from 46 to 70 mol percent based on the number of repeat monomer units in the conjugated diene block of A-B and the polystyrene content is from 25 to 35%.

18. The bituminous emulsion of claim 8 wherein the block copolymer composition comprises A-B wherein each A is styrene, each B is butadiene, and n is 2 to 4, the peak molecular weight of A-B is from 48,000 to 78,000, the vinyl content of A-B is from 46 to 70 mol percent based on the number of repeat monomer units in the conjugated diene block of A-B and the polystyrene content is from 25 to 35% by weight.

19. The bituminous emulsion of claim 10 wherein the block copolymer composition comprises A-B wherein each A is styrene, each B is butadiene, and n is 2 to 4, the peak molecular weight of A-B is from 48,000 to 78,000, the vinyl content is from 46 to 70 mol percent based on the number of repeat monomer units in the conjugated diene block of A-B and the polystyrene content is from 25 to 35%.

\* \* \* \* \*